US012078134B2

(12) United States Patent
Becker et al.

(10) Patent No.: US 12,078,134 B2
(45) Date of Patent: Sep. 3, 2024

(54) FUEL PUMP AND FUEL SUPPLY UNIT

(71) Applicant: Vitesco Technologies GmbH, Hannover (DE)

(72) Inventors: Dirk Becker, Alheim (DE); Michael Bämpfer, Rotenburg (DE); Jens Missun, Lohfelden (DE); Marc Völker, Magdeburg (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 119 days.

(21) Appl. No.: 16/754,671

(22) PCT Filed: Oct. 10, 2018

(86) PCT No.: PCT/EP2018/077557
§ 371 (c)(1),
(2) Date: Apr. 8, 2020

(87) PCT Pub. No.: WO2019/072891
PCT Pub. Date: Apr. 18, 2019

(65) Prior Publication Data
US 2020/0256296 A1    Aug. 13, 2020

(30) Foreign Application Priority Data
Oct. 12, 2017   (DE) .................. 10 2017 218 293.8

(51) Int. Cl.
*F02M 37/10*    (2006.01)
*F02M 37/00*    (2006.01)

(52) U.S. Cl.
CPC ...... *F02M 37/103* (2013.01); *F02M 37/0011* (2013.01)

(58) Field of Classification Search
CPC .... F02M 37/00; F02M 37/0011; F02M 37/10; F02M 37/103; H02K 5/225; H02K 5/132
See application file for complete search history.

(56) References Cited

U.S. PATENT DOCUMENTS 5,007,806 A * 4/1991 Bellis .................... F02M 37/04
417/366
5,013,221 A * 5/1991 Tuckey ............... F04C 15/0049
310/191

(Continued)

FOREIGN PATENT DOCUMENTS

| CN | 1886281 | 12/2006 |
|----|---------|---------|
| CN | 101294529 | 10/2008 |

(Continued)

OTHER PUBLICATIONS

Office Action dated Nov. 30, 2020 issued in German Patent Application No. 10 2017 218 293.8.

(Continued)

*Primary Examiner* — Logan M Kraft
*Assistant Examiner* — Johnny H Hoang
(74) *Attorney, Agent, or Firm* — Cozen O'Connor

(57) ABSTRACT

A fuel pump includes: an electric motor; a pump stage drivable by the electric motor; a fuel pump housing configured to accommodate the electric motor and the pump stage; and a bracket configured to fasten the fuel pump to a wall. The fuel pump housing includes a plastic first housing part configured to accommodate at least one selected from the group of the electric motor and the pump stage. The first housing part is configured as a single piece with the bracket, the bracket being integral with the first housing part.

12 Claims, 4 Drawing Sheets

(56) References Cited

U.S. PATENT DOCUMENTS

| | | | | |
|---|---|---|---|---|
| 7,252,075 | B2* | 8/2007 | Firtion | B60K 15/077 |
| | | | | 123/509 |
| 7,614,855 | B2* | 11/2009 | Cook | F04B 9/04 |
| | | | | 464/106 |
| 8,596,596 | B2* | 12/2013 | Naji | F04D 29/668 |
| | | | | 248/224.7 |
| 8,800,598 | B2* | 8/2014 | Beyer | F02M 37/103 |
| | | | | 137/565.24 |
| 10,280,883 | B2* | 5/2019 | Takahashi | F02M 37/106 |
| 10,294,901 | B1* | 5/2019 | Mason | F02M 37/0017 |
| 2004/0037713 | A1* | 2/2004 | Schelhas | F02M 37/46 |
| | | | | 417/313 |
| 2004/0045962 | A1 | 3/2004 | Firtion et al. | |
| 2005/0058556 | A1* | 3/2005 | Cremer | F02M 37/103 |
| | | | | 417/363 |
| 2005/0220641 | A1* | 10/2005 | Nagata | F02M 37/10 |
| | | | | 417/423.3 |
| 2007/0103014 | A1* | 5/2007 | Sumiya | F02M 37/08 |
| | | | | 310/71 |
| 2008/0078918 | A1 | 4/2008 | Fujiwara et al. | |
| 2008/0184970 | A1 | 8/2008 | Igarashi et al. | |
| 2012/0060949 | A1* | 3/2012 | Okazono | F02M 37/103 |
| | | | | 137/565.17 |
| 2012/0224991 | A1* | 9/2012 | Lipinski | F04C 15/0069 |
| | | | | 264/138 |
| 2019/0242340 | A1* | 8/2019 | Becker | H02K 5/04 |

FOREIGN PATENT DOCUMENTS

| | | |
|---|---|---|
| CN | 101796288 | 8/2010 |
| CN | 201615006 U | 10/2010 |
| DE | 43 36 574 | 5/1995 |
| DE | 60111861 T2 | 11/2000 |
| DE | 4336574 B4 | 6/2005 |
| DE | 102008005522 | 7/2009 |
| DE | 10 2009 046 111 | 5/2011 |
| DE | 10 2015 225 086 | 5/2017 |
| EP | 0 728 937 | 8/1996 |
| EP | 1 431 566 | 6/2004 |
| JP | 6013159 B2 | 10/2016 |
| WO | WO 02/40302 | 5/2002 |
| WO | WO 2011/002970 | 1/2011 |
| WO | WO 2011/051039 | 5/2011 |

OTHER PUBLICATIONS

International Search Report issued in corresponding PCT Application PCT/EP2018/077557.
Written Opinion issued in corresponding PCT Application PCT/EP2018/077557.
Office Action issued in corresponding German Application No. 10 2017 218 293.8.
Office Action dated Jun. 1, 2021 issued in Chinese Patent Application No. 201880061160.3.
Office Action dated Dec. 21, 2021 issued in Chinese Patent Application No. 201880061160.3.
RTM, Integrated Preparation of Composite Primary Structural Components for Armament by Means of Soft Mold Assisted Resin Transfer Molding (SMARTM), ISBN: 978-7-81099-721-8, Jan. 31, 2010, 1-13.

* cited by examiner

FUEL PUMP AND FUEL SUPPLY UNIT

CROSS REFERENCE TO RELATED APPLICATIONS

This is a U.S. national stage of International application No. PCT/EP2018/077557, filed on Oct. 10, 2018, which claims priority to German Application No. 10 2017 218 293.8, filed October 12, 2017, the content of each of which is incorporated herein by reference.

BACKGROUND OF THE INVENTION

1. Field of the Invention

The invention relates to a fuel pump and a fuel conveying unit having a fuel pump of this type for use in a fuel tank of a vehicle for conveying fuel to an internal combustion engine. A "vehicle" is to be understood here as meaning any type of vehicle which has to be supplied with a liquid and/or gaseous fuel for operation, but in particular passenger motor vehicles and/or utility vehicles.

2. Description of the Prior Art

Such fuel pumps and fuel conveying units are widely known from the prior art.

Such a fuel pump is in this case accommodated in positionally fixed fashion by a bracket in a so-called baffle pot—also referred to as fuel reservoir—of a fuel delivery unit of this type to convey fuel out of the baffle pot. Here, the bracket serves firstly for accommodating the fuel pump and secondly for fastening the fuel pump to a wall of the baffle pot.

Here, the bracket furthermore damps the vibrations generated by the fuel pump to reduce undesired noise generation. For this reason, the bracket is based on a certain degree of elasticity that permits compensation movements and which is associated with a decoupling action.

SUMMARY OF THE INVENTION

It is an object of the invention to simplify the accommodation of a fuel pump of this type in a fuel tank of a vehicle, and at the same time save costs.

To achieve this object, a fuel pump is proposed, including an electric motor, a pump stage which can be driven by the electric motor, and a fuel pump housing that accommodates the electric motor and the pump stage.

Here, the fuel pump housing has at least a first housing part composed of plastic, which accommodates at least the electric motor or the pump stage. The housing part is configured as a single piece with a bracket for fastening the fuel pump to a wall, which bracket is formed integrally on the first housing part.

Here, a wall is to be understood to mean a wall of a fuel tank or of a baffle pot of a (fuel conveyor), which itself is installed in a fuel tank. Here, the wall of the baffle pot may comprise not only, for example, a cylindrical wall but also in particular a base-side wall.

Formation of the bracket integrally on the first housing part is to be understood to mean that the housing part is formed as a single piece or in unipartite fashion with the bracket. This means that the bracket is formed jointly during the production of the housing part from plastics.

The need to provide a separate bracket is advantageously eliminated in this way. This in turn contributes to reducing a variety of parts and thus saving costs.

Here, in one embodiment, the bracket may comprise a fastening flange for detent engagement with a detent attached to the wall, wherein the bracket furthermore comprises at least one holding arm formed integrally on the first housing part and which extends as far as the fastening flange. Here, the fastening flange may be arranged at a suction side on the fuel pump housing and transversely, for example orthogonally, with respect to the longitudinal direction of the fuel pump. Here, the fastening flange may, for example, be ring-shaped, for example circular-ring-shaped form and arranged in the region of an inlet opening of the pump stage, wherein the fastening flange may surround, and in so doing enclose, the inlet opening. Here, the fastening flange may be spaced apart somewhat from the inlet opening in a longitudinal direction of the fuel pump so as not to surround the inlet opening in an enclosing manner.

The bracket may, for example, comprise at least three holding arms, which are formed integrally on the first housing part and which extend as far as the fastening flange. As an alternative to this, the bracket may, for example, comprise at least six holding arms, wherein the holding arms are formed integrally in pairwise fashion, with at least a spacing to one another, on the first housing part. Here, the holding arm pairs may be arranged so as to be spaced apart uniformly from one another over their longitudinal extent.

In a further embodiment, the bracket may comprise at least one fastening flange for fitting onto a stud of a wall, wherein the fastening flange is formed integrally on the first housing part transversely with respect to the longitudinal direction of the fuel pump.

Here, the bracket may, for example, comprise at least three fastening flanges which are formed integrally on the first housing part transversely with respect to the longitudinal direction of the fuel pump. Here, the fastening flanges may be arranged so as to be spaced apart uniformly from one another in the circumferential direction of the fuel pump housing.

Also proposed is an arrangement of a fuel pump of the type described above in a baffle pot, on one wall of which there are arranged one or more detents which are engaged with detent action with the fastening flange.

As an alternative to this, there is proposed an arrangement of a fuel pump of the type described above in a baffle pot, on one wall of which there is integrally formed at least one stud onto which the at least one fastening flange is fitted.

Furthermore, a fuel deliverer is proposed which comprises a fuel pump of the type described above or an arrangement of the type described above.

BRIEF DESCRIPTION OF THE DRAWINGS

The invention will be discussed in detail in the following text with reference to the illustrations in the figures. Further advantageous refinements of the invention emerge from the dependent claims and the description below of preferred embodiments. In the figures:

DETAILED DESCRIPTION OF THE PRESENTLY PREFERRED EMBODIMENTS

Below, the same reference designations will be used for identical components or components of identical action.

Figure 1:
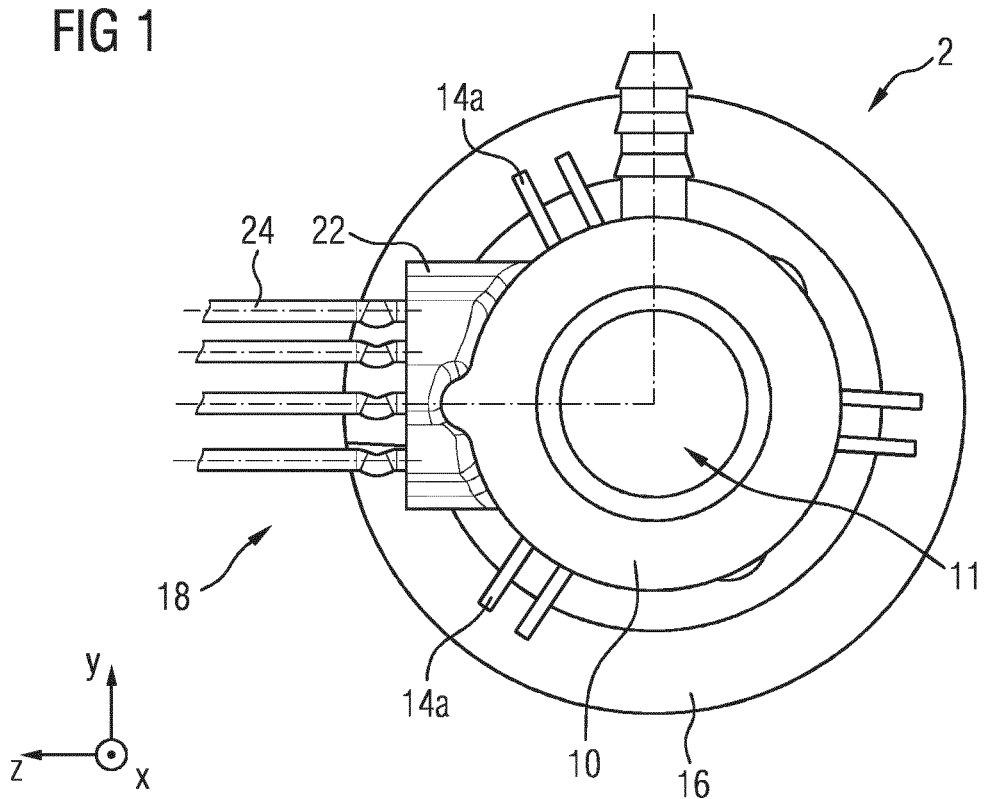
FIG. 1 shows a plan view of a proposed first fuel pump.
Figure 2:
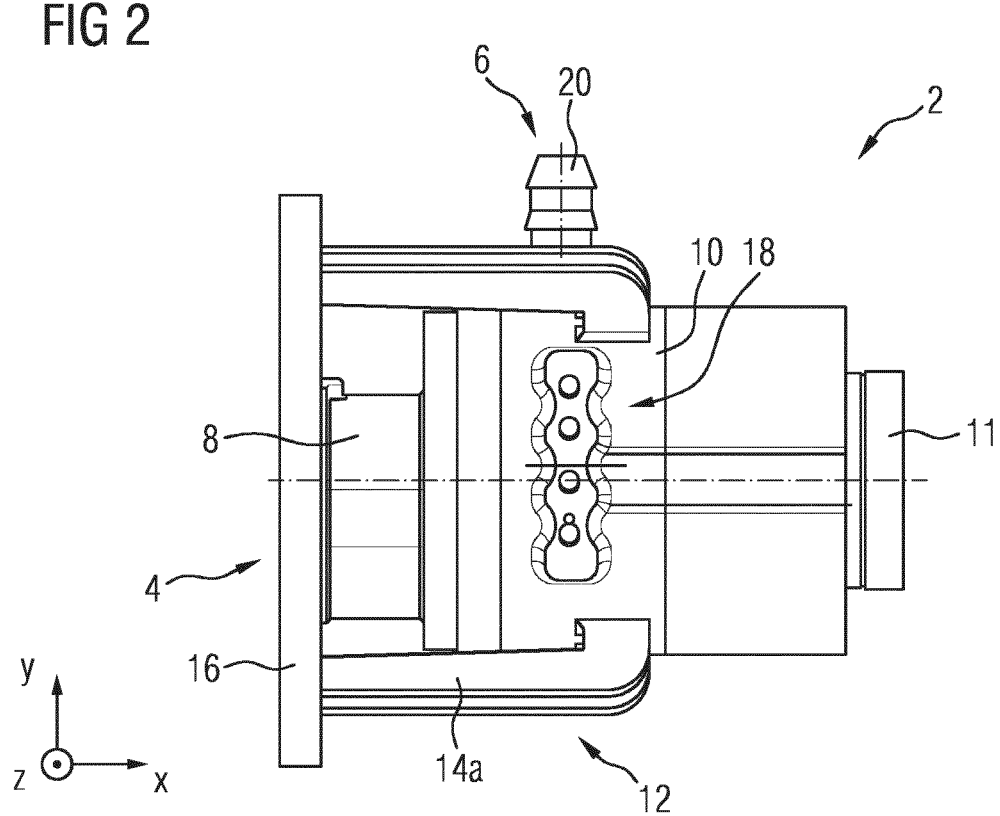
FIG. 2 shows a first side view of the fuel pump shown in FIG. 1.
Figure 3:
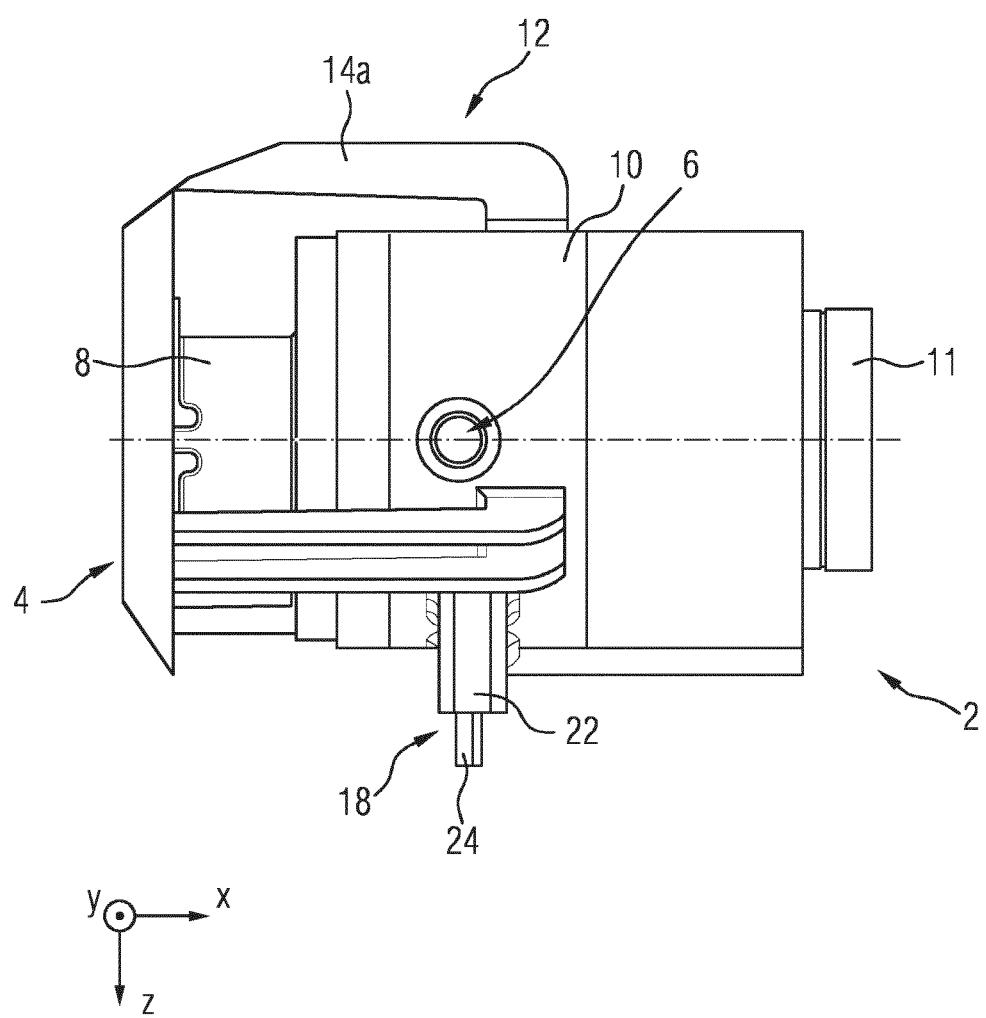
FIG. 3 shows a second side view of the fuel pump shown FIG. 1.

FIGS. 1, 2 and 3 illustrate a first embodiment of a fuel pump 2 having a first housing part 10, a second housing part 8 and a cover 11, which closes the housing part 10. Here, the cover 11 may be regarded as being optional and as belonging to the fuel pump housing. The individual parts 8, 10, 11 are in this case made of a plastic. The housing part 10 accommodates an electric motor, whereas the housing part 8 accommodates a pump stage, for example in the form of a screw pump. Here, the housing part 8 simultaneously functions as a pump cover of the pump stage. The housing part 10 is furthermore formed as a single piece with a bracket 12. The bracket 12 is formed integrally on the housing part 10 and comprises a circular-ring-shaped fastening flange 16, which is arranged at a suction side 4 on the housing part 8 and transversely—and in this exemplary embodiment even orthogonally—with respect to the longitudinal direction X-X of the fuel pump 2, and six holding arms 14a, which are formed integrally on the housing part 10 and which extend as far as the fastening flange 16. Here, the holding arms 14a are formed integrally in pairwise fashion, with a spacing to one another, on the circumference of the first housing part 10, wherein the holding arm pairs are arranged so as to be spaced apart from one another preferably uniformly over their longitudinal extent in the X-X direction. As an alternative to this, it is however also possible for the spacing to be configured to vary.

In this embodiment, a suction-side inlet opening 4 on the housing part 8, via which suction-side inlet opening a fuel is drawn into the conveying chambers of the screw pump, is surrounded, and in this case enclosed, by the fastening flange 16. It would basically also be possible for the fastening flange 16 to be spaced apart from the inlet opening 4 so as to surround the inlet opening 4 in a non-enclosing manner. Via a connector piece 20, which is formed integrally on the housing part 10 at a pressure side and which serves for connection to a fuel line, the conveyed fuel is discharged via an outlet opening 6. Here, the connector piece 20 is formed transversely—and in this exemplary embodiment even orthogonally—with respect to the longitudinal direction X-X of the fuel pump 2. Likewise formed transversely—and in this exemplary embodiment even orthogonally—with respect to the longitudinal direction X-X of the fuel pump 2 is an electrical connection or a connection socket 18 for the electrical connection of the electric motor. The connection 18 comprises a portion 22 which is formed integrally on the housing part 10 and which has contacts which are connected to lines 34, wherein the lines 24 lead away transversely or orthogonally with respect to the longitudinal direction X-X.

Here, the fastening flange 16 serves for the fastening of the fuel pump 2 to a wall, for example a wall of a baffle pot of a fuel conveyor, on which there are formed a fastener, for example in the form of a detent means, which can be engaged with detent action with the fastening flange 16.

The bracket 12 illustrated in FIGS. 1, 2 and 3 exhibits sufficient elasticity that it permits certain compensating movements in order to sufficiently dampen vibrations generated by the fuel pump 2 and consequently reduce an undesired generation of noise.

Figure 4:
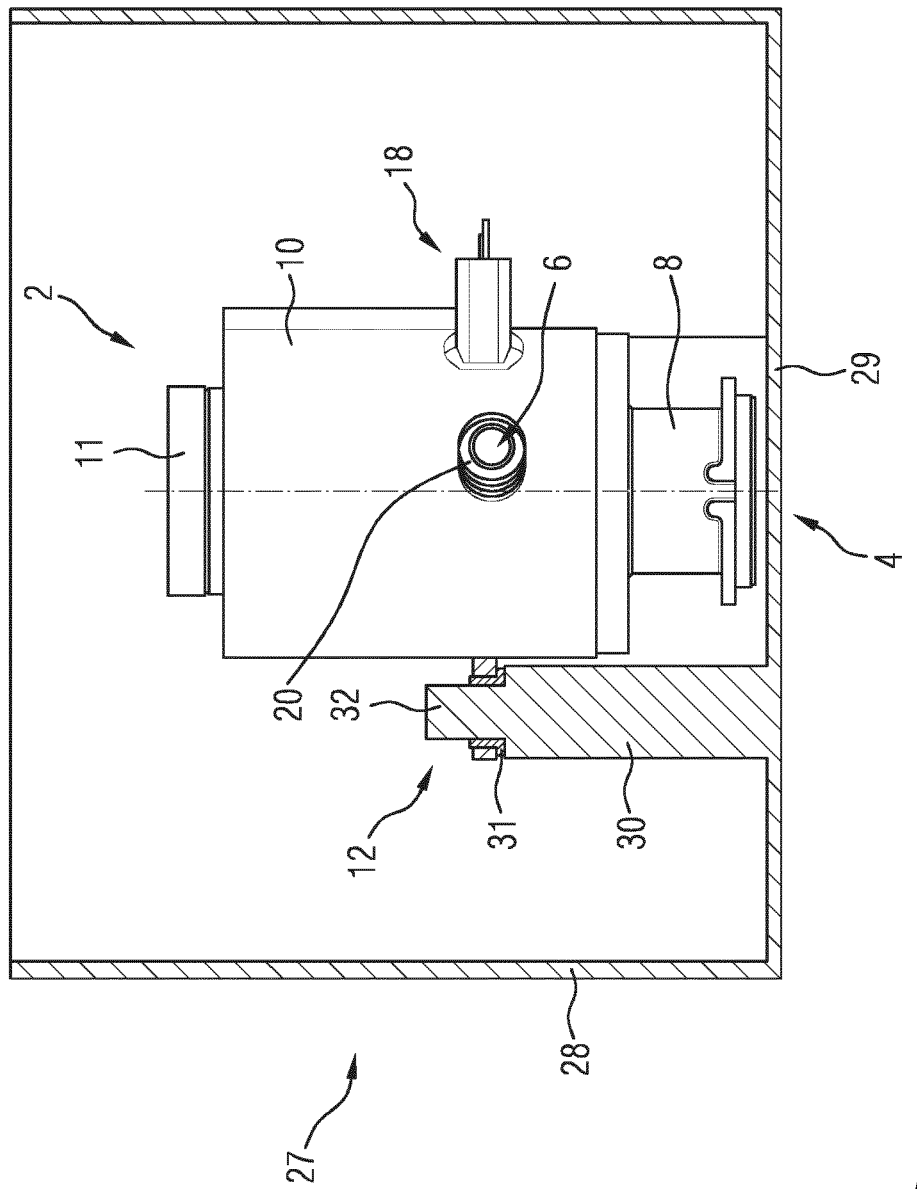
FIG. 4 shows a sectional illustration of a baffle pot with a proposed second fuel pump arranged therein.
Figure 5:
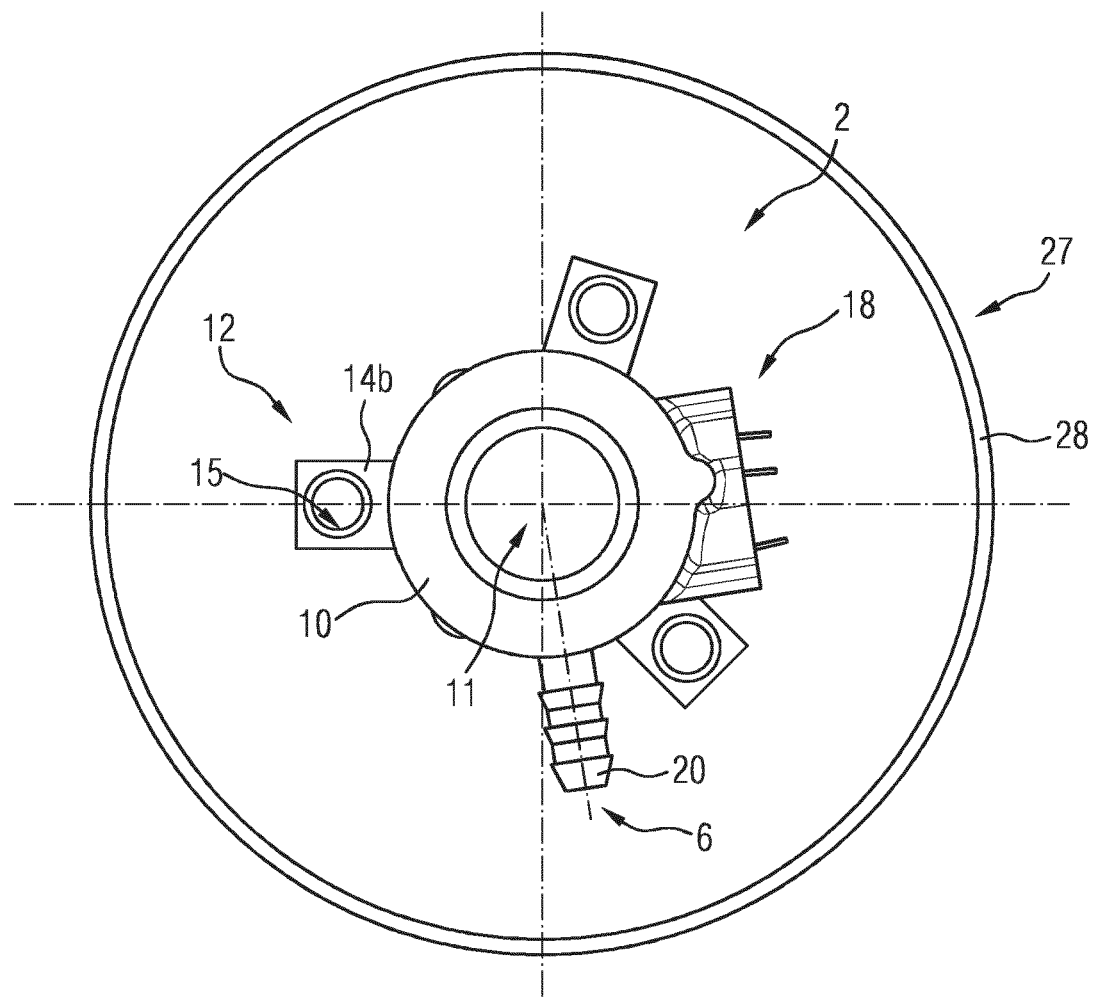
FIG. 5 shows a plan view of the arrangement shown in FIG. 4.

FIGS. 4 and 5 illustrate a second embodiment of a fuel pump 2, on which a total of three fastening flanges 14b, which form a bracket 12, are formed integrally on the housing part 10 transversely—and in this exemplary embodiment even orthogonally—with respect to the longitudinal direction X-X of the fuel pump 2. Here, the fastening flanges 14b are formed integrally on the housing part 10 so as to be spaced apart uniformly from one another in a circumferential direction. Here, the fastening flanges 14b are furthermore of lug-like form and have in each case one passage hole 15, by which the respective lug or the respective fastening flange 14b is fitted onto, and in the process pressed together with, an associated projection 32 of a stud 30 made of plastic. For the pressing-together, a sleeve 31 is used which is arranged between the stud 30, 32 and the lug 14b. Here, the sleeve 31 may be formed as a rubber element in order to act as a decoupling element.

Here, the stud 30 is formed integrally on a base or on a base-side wall 29 of a baffle pot 27 made of plastic. As an alternative to this, the stud 30 could basically also be formed integrally on the wall 28. In the use position of the fuel pump 2, the inlet opening 4 is expediently situated a short distance above the base 29, analogously to the first embodiment as per FIGS. 1, 2 and 3. By the length of the stud 30, the second embodiment is provided with elasticity sufficient to permit certain compensating movements, analogously to the first embodiment, such that the vibrations generated by the fuel pump 2 can be sufficiently dampened, all the more so if the sleeve 31 is formed as a rubber element, as described above. Accordingly, the stud 30 acts as a first decoupling element, and the sleeve 31 acts as a second decoupling element.

These two embodiments have in common the fact that they eliminate the need to provide a separate bracket for the fuel pump. This in turn contributes to reducing a variety of parts, in order to simplify an assembly process and thus save costs.

Although exemplary embodiments have been discussed in the above description, it should be noted that numerous modifications are possible. Furthermore, it should be noted that the exemplary embodiments are merely examples which are not intended to limit the scope of protection, the applications and the structure in any way. Instead, the above description gives the person skilled in the art a guideline for the implementation of at least one exemplary embodiment, wherein various changes may be made, especially with regard to the function and arrangement of the component parts described, without departing from the scope of protection as emerges from the claims and combinations of features equivalent thereto.

The invention claimed is:
1. A fuel pump, comprising
an electric motor;
a pump stage drivable by the electric motor;
a fuel pump housing (8, 10) configured to accommodate the electric motor and the pump stage; and
a bracket (12) configured to fasten the fuel pump (2) to a wall
wherein:
the fuel pump housing (8, 10) comprises a first housing part (10) and a second housing part (8), the first housing part (10) being made of plastic and being configured to radially enclose the electric motor and the second housing part (8) being made of plastic and being configured to radially enclose the pump stage and to be a cover for the pump stage, the first housing part (10) has a first external diameter and the second housing part (8) has a second external diameter that is smaller than the first external diameter, and the first housing part (10) is configured as a single piece with the bracket (12), the bracket being integral with the first housing part (10), wherein the bracket (12) axially extends over at least a portion of an axial length of the first housing part (10) and an entire axial length of the second housing part (8) and circumferentially surrounds at least a portion of an outside the second housing part (8).

2. The fuel pump as claimed in claim 1, wherein the bracket (12) comprises:

a fastening flange (16) for detent engagement with a detent attached to the wall, and at least one holding arm (14*a*) configured integrally on the first housing part (10), the at least one holding arm extending as far as the fastening flange (16).

3. The fuel pump as claimed in claim 2, wherein the fastening flange (16) is arranged at a suction side on the fuel pump housing (8, 10) and is arranged transversely with respect to a longitudinal direction of the fuel pump (2).

4. The fuel pump as claimed in claim 2, wherein the fastening flange (16) is ring-shaped and is arranged so as to surround an inlet opening (4) of the pump stage.

5. The fuel pump as claimed in claim 2, wherein the bracket (12) comprises at least three holding arms (14*a*) configured integrally on the first housing part (10), the at least three holding arms (14*a*) extending as far as the fastening flange (16).

6. The fuel pump as claimed in claim 5, wherein the bracket (12) comprises at least six holding arms (14*a*), configured integrally in pairs, with at least a spacing with respect to one another, on the first housing part (10).

7. The fuel pump as claimed in claim 6, wherein the holding arm pairs (14*a*) are arranged so as to be spaced apart uniformly from one another over their longitudinal extent (X-X).

8. A fuel conveyer comprising the fuel pump (2) as claimed in claim 2 arranged in a baffle pot, on one wall of which baffle pot there is arranged a detent engageable, by detent engagement, with the fastening flange (16).

9. The fuel pump as claimed in claim 1, wherein the bracket (12) comprises at least one fastening flange (14*b*) configured to fit onto a stud (32, 30) of the wall (29), wherein the at least one fastening flange (14*b*) is configured integrally on the first housing part (10) transversely with respect to a longitudinal direction (X-X) of the fuel pump (2).

10. The fuel pump as claimed in claim 9, wherein the bracket (12) comprises at least three fastening flanges (14*b*) configured integrally on the first housing part (10) transversely with respect to the longitudinal direction (X-X) of the fuel pump (2).

11. The fuel pump as claimed in claim 10, wherein the fastening flanges (14*b*) are arranged so as to be spaced apart uniformly from one another.

12. A fuel conveyer comprising the fuel pump (2) as claimed in claim 9 arranged in a baffle pot (27), on one wall (29) of which baffle pot there is integrally arranged at least one stud (32, 30) onto which the at least one fastening flange (14*b*) is fitted.

\* \* \* \* \*